(12) United States Patent
Shimada et al.

(10) Patent No.: US 11,768,616 B2
(45) Date of Patent: Sep. 26, 2023

(54) RESOURCE ALLOCATION CONTROL DEVICE, COMPUTING SYSTEM, AND RESOURCE ALLOCATION CONTROL METHOD

(71) Applicant: Hitachi, Ltd., Tokyo (JP)

(72) Inventors: Akio Shimada, Tokyo (JP); Mitsuo Hayasaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/692,363

(22) Filed: Mar. 11, 2022

(65) Prior Publication Data
US 2023/0069861 A1 Mar. 9, 2023

(30) Foreign Application Priority Data
Sep. 3, 2021 (JP) .................... 2021-144337

(51) Int. Cl.
*G06F 3/06* (2006.01)
(52) U.S. Cl.
CPC .......... *G06F 3/0631* (2013.01); *G06F 3/0604* (2013.01); *G06F 3/067* (2013.01); *G06F 3/0634* (2013.01); *G06F 3/0659* (2013.01)
(58) Field of Classification Search
None
See application file for complete search history.

(56) References Cited

U.S. PATENT DOCUMENTS 10,282,350 B1\* 5/2019 Pathak ............... G06F 16/2453
2014/0380307 A1 12/2014 Zhu et al.
2022/0075657 A1\* 3/2022 Shimada ............... G06F 9/5011

\* cited by examiner

*Primary Examiner* — Brian R Peugh
(74) *Attorney, Agent, or Firm* — Volpe Koenig

(57) ABSTRACT

A management node that controls a hardware resource amount of a node to be allocated to a distributed data store includes: a disk device that stores an application performance model indicating a correspondence relationship between an application performance and a distributed data store performance, and stores a data store performance model indicating a correspondence relationship between the hardware resource amount and data store performance of the distributed data store; and a CPU. The CPU is configured to: receive target performance information by the application; determine a required performance which is a distributed data store performance required for achieving a performance to be specified by the target performance information based on the application performance model; determine a hardware resource amount required for achieving the required performance based on the data store performance model; and set the determined resource amount to be allocated to the distributed data store.

10 Claims, 14 Drawing Sheets

FIG. 4

| ID | Name | Description |
|---|---|---|
| 0 | APPLICATION A | Image Analysis |
| 1 | APPLICATION B | Voice Analysis |
| 2 | APPLICATION C | Movie Analysis |
| 3 | APPLICATION D | Natural Language Analysis |

321

1001  1002  1003

| 512 | DATA STORE A | 513 | | |
|---|---|---|---|---|
| OPERATION | HW RESOURCE | | | |
| | CPU | MEMORY | NIC BAND | Block IO BAND |
| Sequential Read [MB/s] | y=f1(x) | y=f2(x) | y=f3(x) | y=f4(x) |
| Sequential Write [MB/s] | ... | ... | ... | ... |
| Random Read [IOPS] | ... | ... | ... | ... |
| Random Write [IOPS] | ... | ... | ... | ... |
| Metadata Ops. [OPS] | ... | ... | ... | ... |

FIG. 10
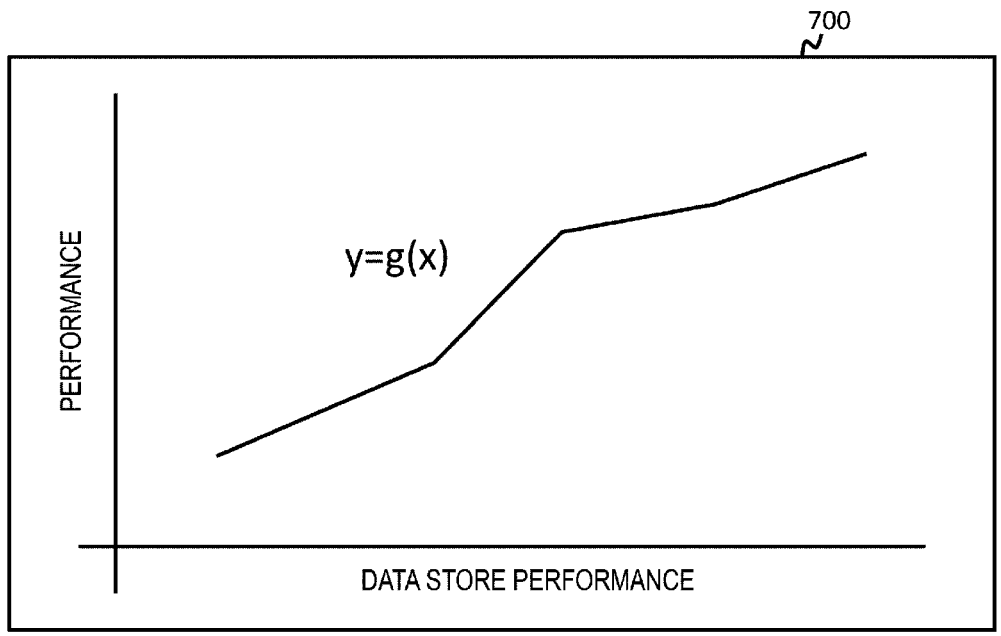
FIG. 11
| 712 | APPLICATION A | 713 |
|---|---|---|
| OPERATION | MODEL EXPRESSION | |
| Sequential Read [MB/s] | y=g1(x) | |
| Random Read [IOPS] | y=g3(x) | |
FIG. 12
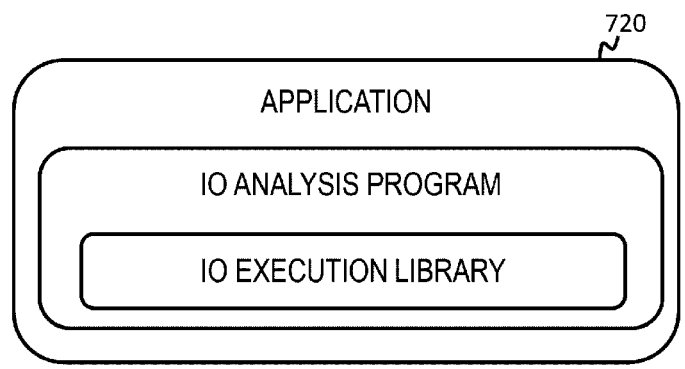

FIG. 16

| Config | Content |
|---|---|
| File Server IP | 10.0.0.5 |
| Port | 9000 |
| Mount Directory | /mnt/data/ |
| ... | ... |

CONCEPTUAL DIAGRAM OF RESOURCE
ALLOCATION AMOUNT CALCULATION PROCESS.

RESOURCE ALLOCATION CONTROL DEVICE, COMPUTING SYSTEM, AND RESOURCE ALLOCATION CONTROL METHOD

BACKGROUND OF THE INVENTION

1. Field of the Invention

The present invention relates to an allocation control technique of a hardware resource (HW resource) for execution of software.

2. Description of the Related Art

A data lake is widely used as a storage for storing data for artificial intelligence (AI) and data analysis. The data lake is a multi-protocol data store, and mainly uses a distributed data store such as File storage/Object storage/NoSQL. The data lake includes a plurality of distributed data stores, so that there is a problem that in each node constituting the data lake, a conflict of HW resource occurs between the distributed data stores, and performances of the distributed data stores become unstable. Therefore, a quality of service (QoS) control for solving such a problem is required.

As a technique for allocating an HW resource, there has been known a technique for controlling a computation resource to be allocated to a VM that executes an application (see, for example, United States Patent Application Publication No. 2014/0380307).

For example, an application may access a distributed data store to perform various processes, and even when an HW resource for a VM that executes the application is appropriately allocated, a desired performance may not be exhibited depending on a state of the distributed data store to be accessed by the application.

However, there may be no function of allocating the HW resource to the distributed data store being used, or there may be no function that can change the allocation of the HW resource for the distributed data store. Even when there is the function that can change the allocation of the HW resource for the distributed data store, it is very difficult to determine how to allocate the HW resource.

SUMMARY OF THE INVENTION

The invention is made in view of the above-mentioned circumstances, and an object of the invention is to provide a technique capable of easily and appropriately allocating an HW resource to a distributed data store.

In order to achieve the above-mentioned object, a resource allocation control device according to an aspect is a resource allocation control device that controls a hardware resource amount of a plurality of nodes to be allocated to a distributed data store that is executed by the plurality of nodes and distributes and manages data by the plurality of nodes, the resource allocation control device including: a storage unit configured to store application performance information indicating a correspondence relationship between a performance of an application that accesses the distributed data store and executes a predetermined process and a distributed data store performance required for achieving the performance of the application, and store data store performance resource amount information indicating a correspondence relationship between the hardware resource amount and a data store performance that is achievable by the distributed data store according to the hardware of the resource amount; and a processor connected to the storage unit. The processor is configured to: receive target performance information capable of specifying a target performance of the application; determine a required performance which is a distributed data store performance required for achieving a performance to be specified by the target performance information based on the application performance information; determine a hardware resource amount required for achieving the required performance based on the data store performance resource amount information; and set the hardware of the determined resource amount to be allocated to the distributed data store.

According to the invention, an HW resource can be easily and appropriately allocated to a distributed data store.

BRIEF DESCRIPTION OF THE DRAWINGS

FIG. 4 is a configuration diagram of an application management table according to the embodiment.
FIG. 10 is a diagram illustrating an outline of an application performance model according to the embodiment.
FIG. 11 is a configuration diagram of an application performance model management table according to the embodiment.
FIG. 12 is a diagram illustrating an implementation example of a processing unit that analyzes an IO operation according to the embodiment.
FIG. 16 is a configuration diagram of application setting information according to the embodiment.

DESCRIPTION OF THE PREFERRED EMBODIMENTS

Embodiments will be described with reference to the drawings. The embodiments to be described below do not limit the invention according to the claims, and all elements and combinations of the elements described in the embodiments are not necessarily essential to the solution of the invention.

In the following description, a process may be described using a "program" as a subject of an operation. A program may be executed by a processor (for example, a CPU) to perform a predetermined process while appropriately using a storage resource (for example, a memory) and/or a communication interface device (for example, a network interface card (NIC)), and thus the subject of the process may be the program. The process described with the program as the subject of the operation may be a process performed by a processor or a computer including the processor.

In the following description, information may be described by an expression of "AAA table", but the information may be expressed by any data structure. That is, in order to indicate that the information does not depend on the data structure, the "AAA table" may be referred to as "AAA information".

Figure 1:
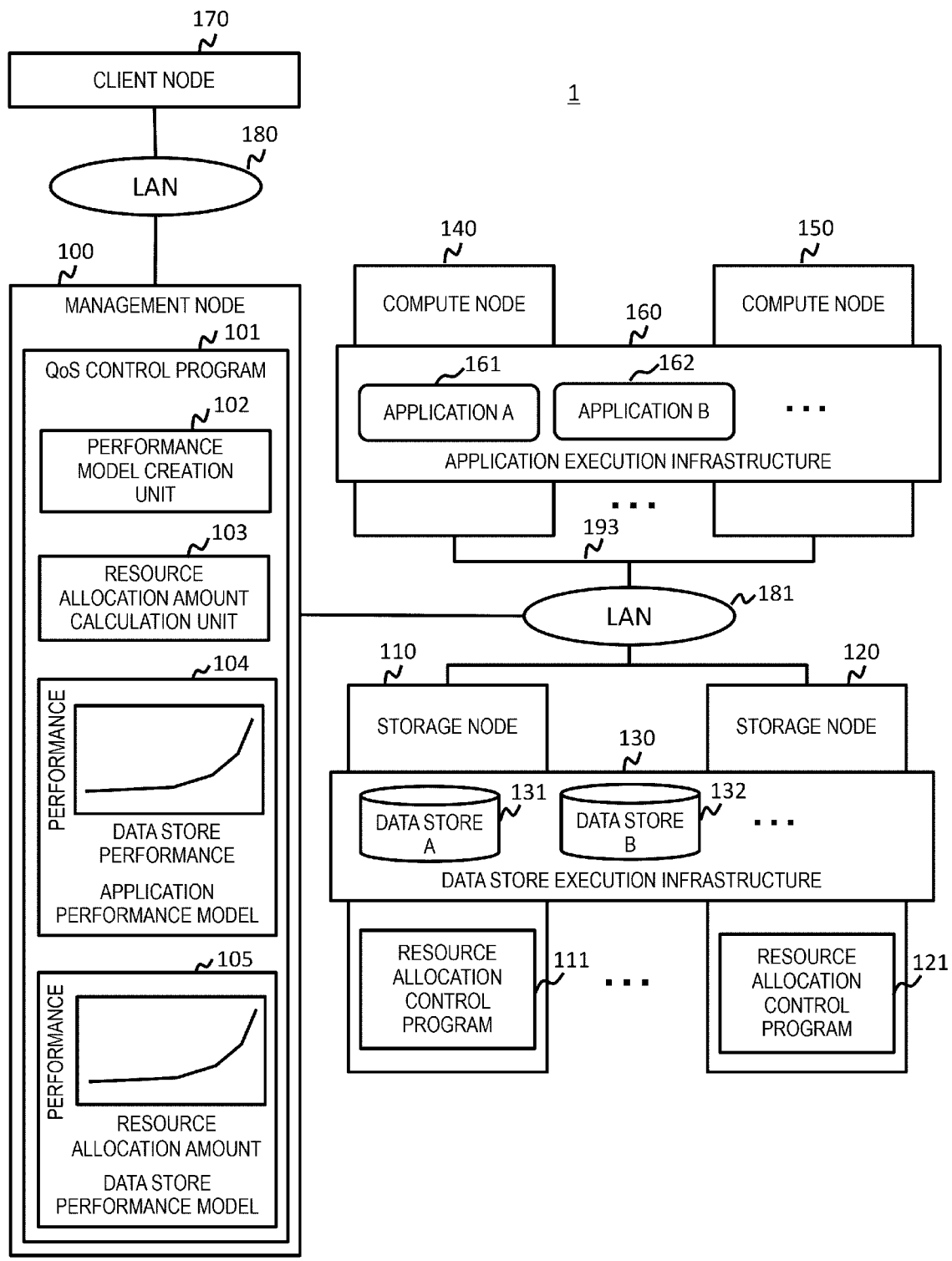
FIG. 1 is an overall configuration diagram of a computing system according to an embodiment.

FIG. 1 is an overall configuration diagram of a computing system according to an embodiment.

A computing system 1 includes a management node 100 as an example of a resource allocation control device, storage nodes 110 and 120, compute nodes 140 and 150, and a client node 170.

The management node 100 and the client node 170 are connected to each other via a network such as a local area network (LAN) 180. The management node 100 is connected to the storage nodes 110 and 120 and the compute nodes 140 and 150 via a network such as the LAN 181.

The compute nodes 140 and 150 cooperate (by a plurality of compute nodes) to constitute an application execution infrastructure 160, execute a process by executing applications 161 (application A), 162 (application B), and the like by the application execution infrastructure 160, and issue IO requests (a read request, a write request, and the like) for data stores (distributed data stores) constituted on the storage nodes 110 and 120 along with the process. In the drawing, two compute nodes are illustrated, but the compute node may be one, or three or more.

The storage nodes 110 and 120 cooperate to constitute a data store execution infrastructure 130, and execute one or more distributed data stores (a data store 131 (data store A) and a data store 132 (data store B)) by the data store execution infrastructure 130. In the drawing, two storage nodes are illustrated, but the storage node may be three or more. The number of the distributed data stores constituted in the data store execution infrastructure 130 may be one, or two or more.

The data stores 131 and 132 constituted by the storage nodes 110 and 120 receive the IO requests issued from applications of the compute nodes 140 and 150, and execute IO processes corresponding to the IO requests. The storage nodes 110 and 120 store resource allocation control programs 111 and 121, respectively. The resource allocation control programs 111 and 121 control, based on a setting of an allocation amount of an HW resource (HW resource allocation amount) from the management node 100, an amount of the HW resource to be allocated to a program (software) of each data store.

The client node 170 receives information (target performance information: for example, a key performance indicator (KPI)) capable of specifying target performances for the applications 161 and 162 executed on the compute nodes from an administrator, and transmits the target performance information to the management node 100.

The management node 100 stores a QoS control program 101. The QoS control program 101 stores an application performance model 104 and a data store performance model 105.

The application performance model 104 is an example of application performance information indicating a relationship between a performance of an application and a performance of a required data store (required performance). In the drawing, only one application performance model is illustrated, but the number of the application performance model may be equal to the number of applications to be executed on the compute nodes, or a plurality of application performance models may be provided for one application.

The data store performance model 105 is an example of data store performance resource amount information indicating a relationship between the resource allocation amount and the performance of the data store. In the drawing, only one data store performance model is illustrated, but the number of the data store performance model may be equal to the number of distributed data stores constituted on the storage nodes, or a plurality of data store performance models may be provided for one data store.

The QoS control program 101 is executed to constitute a performance model creation unit 102 and a resource allocation amount calculation unit 103. The performance model creation unit 102 creates the application performance model 104 and the data store performance model 105. The resource allocation amount calculation unit 103 calculates the HW resource allocation amounts for the data stores 131 and 132 constituted on the storage nodes 110 and 120 based on the application performance model 104, the data store performance model 105, and the target performance information received from the client node 170. The resource allocation amount calculation unit 103 transmits the calculated HW resource allocation amounts to the resource allocation control program 111 of the storage node 110 and the resource allocation control program 121 of the storage node 120.

Figure 2:
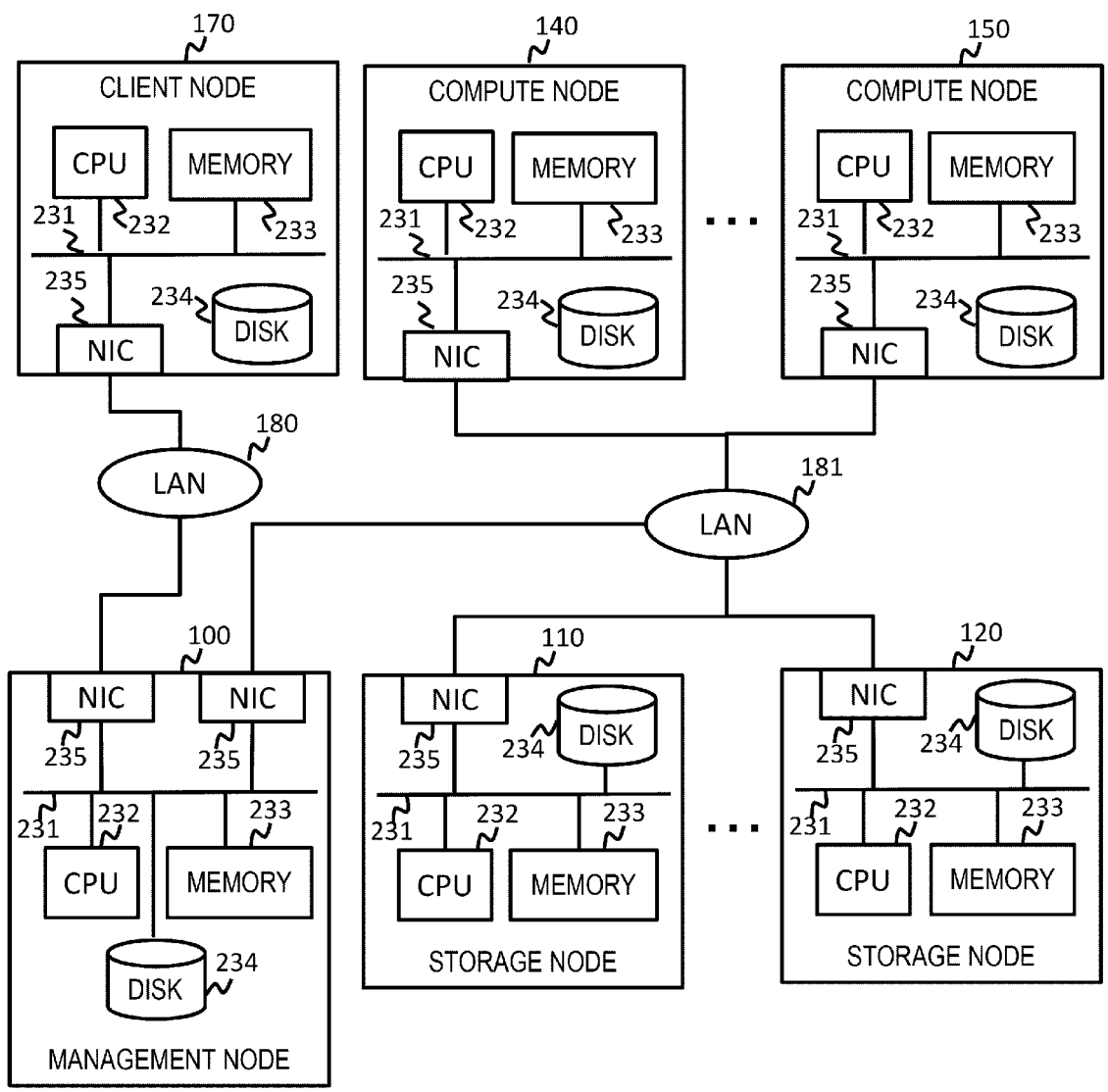
FIG. 2 is a hardware configuration diagram of the computing system according to the embodiment.

FIG. 2 is a hardware configuration diagram of the computing system according to the embodiment.

According to the present embodiment, in an application performance model creation process and a data store performance model creation process to be described later, the compute nodes 140 and 150 that actually execute an application to be used by a user and the storage nodes 110 and 120 that constitute data stores actually provided to the compute nodes 140 and 150 are used, but the invention is not limited thereto, and similar compute nodes different from the compute nodes 140 and 150 may be used, and a plurality of similar storage nodes different from the storage nodes 110 and 120 may be used.

The management node 100 includes a CPU 232 as an example of a processor, a memory 233 as a main memory, a disk device 234 as a secondary storage device, and one or more NICs 235. The CPU 232, the memory 233, the disk device 234, and the one or more NICs 235 are connected via a bus 231.

The CPU 232 executes various processes by reading a program stored in the disk device 234 into the memory 233 and executing the program. The CPU 232 performs transmission and reception of data between other devices (the storage nodes 110 and 120, the compute nodes 140 and 150, the client node 170, and the like) connected to the LANs (180 and 181) via the bus 231 and the NICs 235.

Each of the storage nodes 110 and 120 includes the CPU 232, the memory 233, the disk device 234, and the NIC 235. The CPU 232, the memory 233, the disk device 234, and the NIC 235 are connected via the bus 231.

Each of the compute nodes 140 and 150 includes the CPU 232, the memory 233, the disk device 234, and the NIC 235. The CPU 232, the memory 233, the disk device 234, and the NIC 235 are connected via the bus 231.

The client node 170 includes the CPU 232, the memory 233, the disk device 234, and the NIC 235. The CPU 232, the memory 233, the disk device 234, and the NIC 235 are connected via the bus 231.

Figure 3:
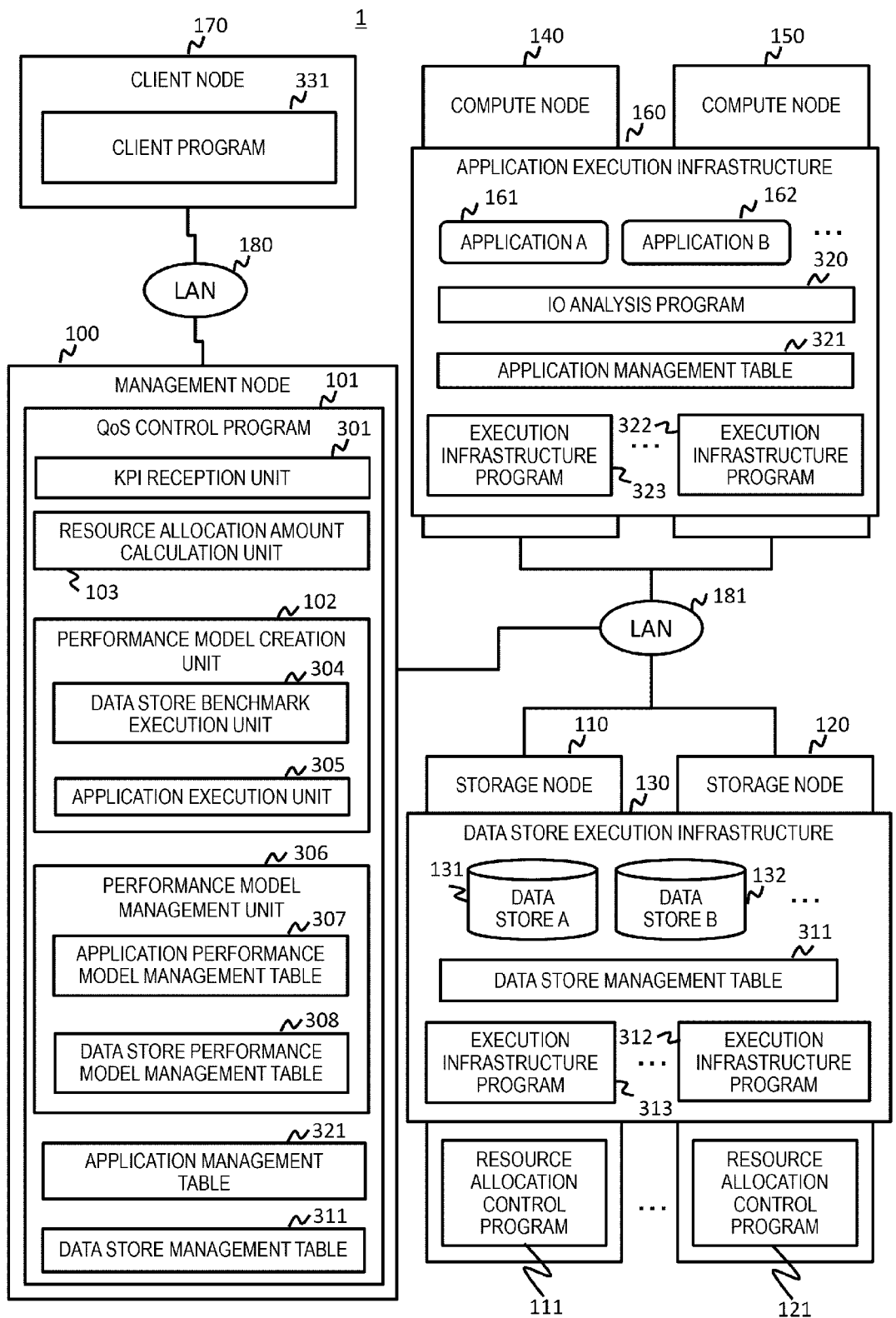
FIG. 3 is a logical configuration diagram of the computing system according to the embodiment.

FIG. 3 is a logical configuration diagram of the computing system according to the embodiment.

The client node 170 stores a client program 331. When being executed by the CPU 232 of the client node 170, the client program 331 receives target performance information (for example, KPI) input by a user of the client node 170 and transmits the target performance information to the management node 100.

The management node 100 stores the QoS control program 101. When being executed by the CPU 232 of the management node 100, the QoS control program 101 constitutes a KPI reception unit 301, the resource allocation amount calculation unit 103, the performance model creation unit 102, and a performance model management unit 306.

The KPI reception unit 301 receives the target performance information transmitted from the client node 170.

The performance model creation unit 102 includes a data store benchmark execution unit 304 and an application execution unit 305. The data store benchmark execution unit 304 measures performances of the data stores (for example, a program constituting the data stores) in the storage nodes 110 and 120, and creates the data store performance model 104. The application execution unit 305 measures performances of applications in the compute nodes 140 and 150, and creates the application performance model 105.

The performance model management unit 306 manages an application performance model management table 307 and a data store performance model management table 308. The performance model management unit 306 manages the data store performance model and the application performance model that are created by the performance model creation unit 102 using the application performance model management table 307 and the data store performance model management table 308.

The QoS control program 101 stores an application management table 321 and a data store management table 311. The storage node 110 stores an execution infrastructure program 313 and the resource allocation control program 111.

When being executed by the CPU 232, the resource allocation control program 111 controls the amount of the HW resource (HW resource allocation amount) to be allocated to the program of each data store to be executed by the storage node 110.

The storage node 120 stores an execution infrastructure program 312 and the resource allocation control program 121.

When being executed by the CPU 232, the resource allocation control program 121 controls the amount of the HW resource (HW resource allocation amount) to be allocated to the program of each data store to be executed by the storage node 120.

The execution infrastructure program 313 to be executed by the CPU 232 of the storage node 110 and the execution infrastructure program 312 to be executed by the CPU 232 of the storage node 120 operate in cooperation with each other to constitute the data store execution infrastructure 130. In the data store execution infrastructure 130, the data store management table 311 is managed, and programs of data stores (131, 132, and the like) are executed to constitute the data stores.

The compute node 140 stores an execution infrastructure program 323. The compute node 150 stores an execution infrastructure program 322.

The execution infrastructure program 323 to be executed by the CPU 232 of the compute node 140 and the execution infrastructure program 322 to be executed by the CPU 232 of the compute node 150 operate in cooperation with each other to constitute the application execution infrastructure 160. An execution form of an application in the application execution infrastructure 160 may be any of a container, a virtual machine (VM), a process, and the like. In the application execution infrastructure 160, the application management table 321 is managed, and the applications 161 and 162 and an IO analysis program 320 are executed.

The IO analysis program 320 analyzes an IO issued by the application. For example, the IO analysis program 320 analyzes whether an operation type of the IO is random read, random write, sequential read, sequential write, or the like. As a method of analyzing the IO issued by the application, a method of acquiring an execution log of the application, a method of analyzing an operation of the application at an operating system (OS) level, a method of hooking (overriding) a library used in the application, or the like may be used.

FIG. 4 is a configuration diagram of an application management table according to the embodiment.

The application management table 321 is a table for managing applications that can be executed on the application execution infrastructure 160, and the application management table 321 stores an entry for each of the applications. The entry stored in the application management table 321 includes fields of an ID 1001, a name 1002, and a description 1003.

For the ID 1001, an identifier (ID) of the application corresponding to the entry is stored. For the name 1002, the name of the application corresponding to the entry is stored. For the description 1003, a description of a processing content of the program corresponding to the entry is stored.

Figure 5:
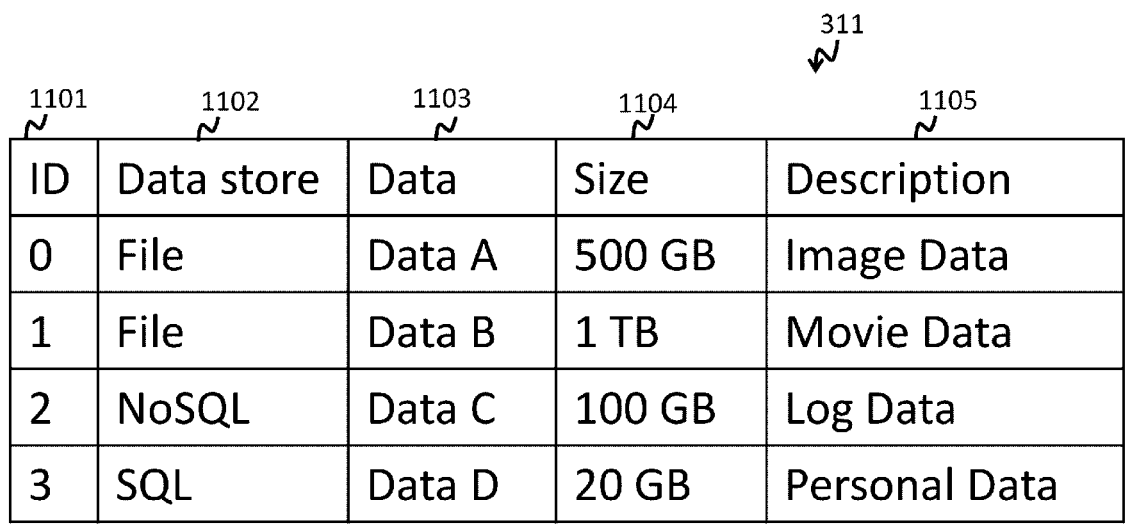
FIG. 5 is a configuration diagram of a data store management table according to the embodiment.

FIG. 5 is a configuration diagram of a data store management table according to the embodiment.

The data store management table 311 is a table for managing data stores created in the data store execution infrastructure 130, and the data store management table 311 stores an entry for each of the data stores. The entry stored in the data store management table 311 includes fields of an ID 1101, a data store 1102, data 1103, a size 1104, and a description 1105.

For the ID 1101, an identifier (ID) of the data store corresponding to the entry is stored. For the data store 1102, a type of data store corresponding to the entry is stored. For the data 1103, a name of data to be stored in the data store corresponding to the entry is stored. For the size 1104, a size of the data corresponding to the entry is stored. For the description 1105, a description of the data to be stored in the data store corresponding to the entry is stored.

Next, a data store performance model creation process 400 for creating a data store performance model will be described.

Figure 6:
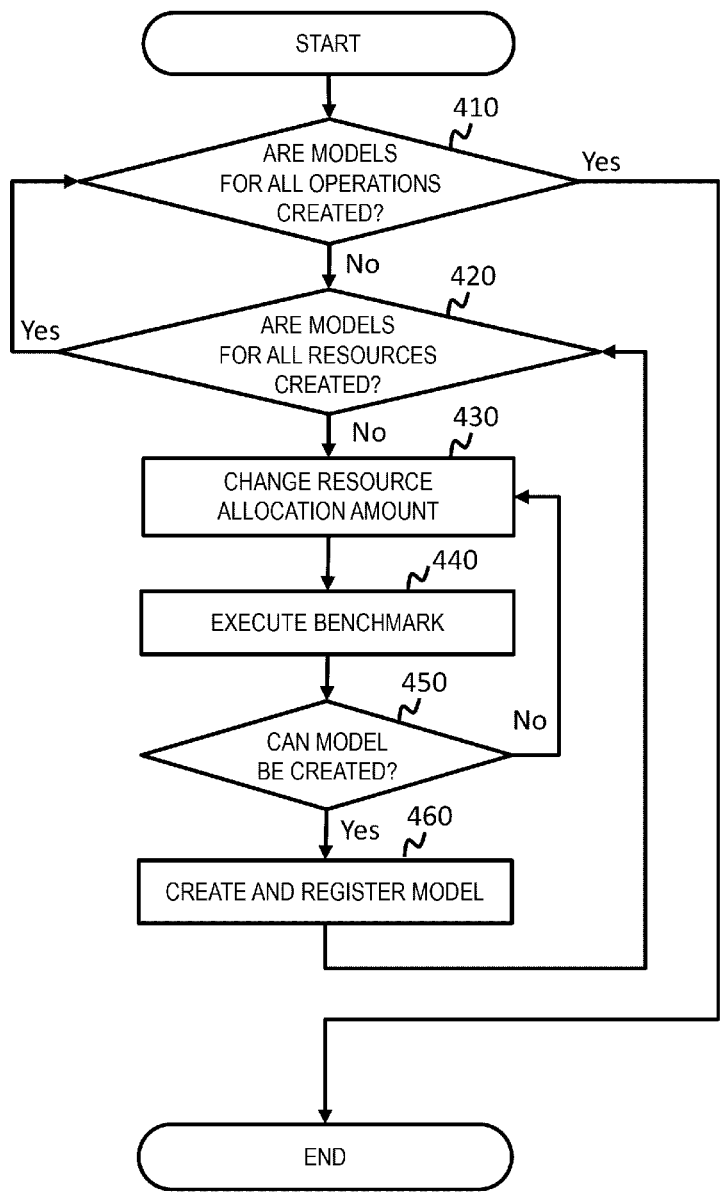
FIG. 6 is a flowchart of a data store performance model creation process according to the embodiment.

FIG. 6 is a flowchart of a data store performance model creation process according to the embodiment.

In the data store performance model creation process according to the present embodiment, the data store performance model is created for each type of operation of the distributed data store. Here, the operation refers to an IO operation with respect to a data store, and for example, if the data store is a file data store, the operation refers to sequential read/write, random read/write, or metadata operation (for example, file creation/deletion, directory creation/deletion), and if the data store is an NoSQL data store, the operation refers to insertion, deletion, or search of data with respect to a data base (DB). In the present embodiment, the data store performance model for each type of operation is created for each HW resource. Here, the HW resource refers to a CPU, a memory, an NIC band, an IO band of a disk device, or the like. According to this data store performance model creation process, a data store performance model indicating a relationship between an allocation amount of each HW resource and a performance of the distributed data store (strictly speaking, the data store program) at the allocation amount is created for each type of operation.

First, the data store benchmark execution unit 304 (the CPU 232 that executes the QoS control program 101) checks whether data store performance models for all types of operations of the distributed data store are created (step 410). As a result, when the performance models for all the types of operations are created (Yes in step 410), the data store benchmark execution unit 304 ends the data store performance model creation process 400.

On the other hand, when the data store performance models for all the types of operations are not created (No in step 410), the data store benchmark execution unit 304 creates data store performance models for types of operations as a target for which data store performance models are not created. Here, the types of operations as a target are referred to as target operation types.

First, for the target operation types, the data store benchmark execution unit 304 checks whether the data store performance models of all HW resources as a target for which data store performance models are to be created are created (step 420).

As a result, for the target operation types, when the data store performance models of all the HW resources as a target are created (Yes in step 420), the data store benchmark execution unit 304 advances the process to step 410.

On the other hand, when the data store performance models of the HW resources as a target are not all created (No in step 420), the data store benchmark execution unit 304 creates data store performance models of HW resources for which data store performance models are not created (referred to as target HW resources). Here, when creating the data store performance models of the target HW resources, by setting an allocation amount that does not become a bottleneck of the performance of the target HW resources for an HW resource other than the target HW resources and by gradually changing the HW resource allocation amount of the target HW resources, the data store performance models are created.

First, the data store benchmark execution unit 304 changes the HW resource amount to be allocated to the distributed data store (step 430). The HW resource allocation amount in the distributed data store is changed in cooperation with the resource allocation control program of each storage node. Specifically, the data store benchmark execution unit 304 transmits the HW resource allocation amount for the data store program of the distributed data store to the resource allocation control program of each storage node. Accordingly, the resource allocation control program receives the HW resource allocation amount and allocates the HW resource to the data store program by the received HW resource allocation amount. The allocation of the HW resource in the storage node can be achieved by an existing program or software. For example, in the case of a Linux (registered trademark) operating system, a resource allocation function called Cgroups can be used. When this Cgroups is used, a desired amount of HW resource can be allocated to a program operating on the Linux operating system.

Next, the data store benchmark execution unit 304 executes a performance measurement for the target operation types of the distributed data store (step 440).

Next, the data store benchmark execution unit 304 determines whether the data store performance models can be created, specifically, whether the performance measurement is performed the number of times required for creating the data store performance models (step 450).

As a result, when the measurement is not performed the number of times required for creating the data store performance models (No in step 450), the data store benchmark execution unit 304 advances the process to step 430, and repeats the change in the HW resource allocation amount and the execution of the performance measurement. The number of times the performance measurement is performed to create the data store performance models and the HW resource allocation amount to be changed for each performance measurement are determined in advance.

On the other hand, when the measurement is performed the number of times required for creating the data store performance models (Yes in step 450), the data store benchmark execution unit 304 creates the data store performance models based on a plurality of measurement results, registers the created data store performance models in the data store performance model management table 308 (see FIG. 8) (step 460), and advances the process to step 420.

Here, a creation of the data store performance model and a registration of the data store performance model will be described.

Figures 7, 8:
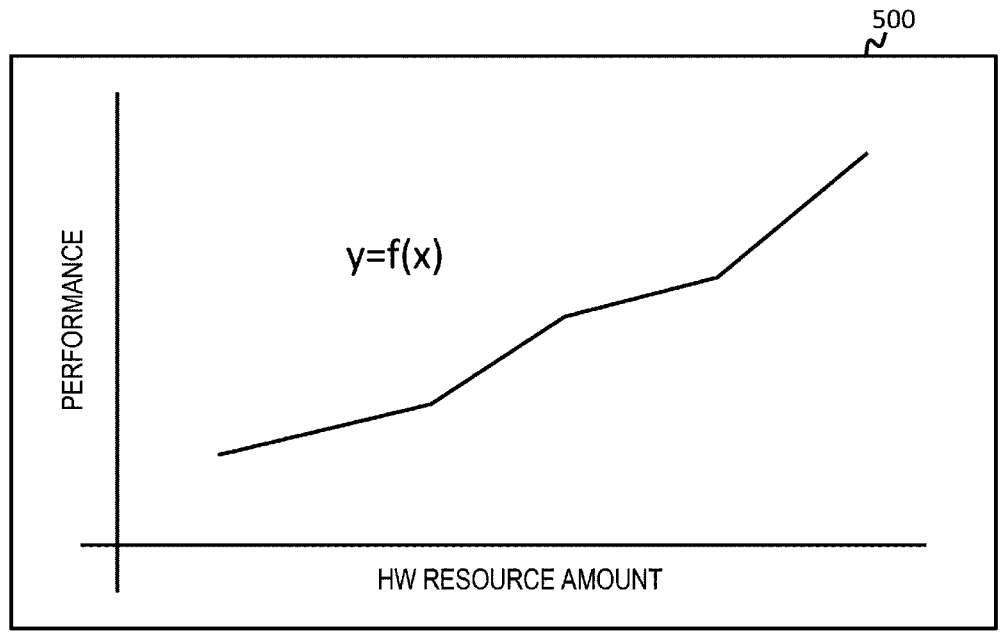
FIG. 7 is a diagram illustrating an outline of a data store performance model according to the embodiment.
FIG. 8 is a configuration diagram of a data store performance model management table according to the embodiment.

FIG. 7 is a diagram illustrating an outline of the data store performance model according to the embodiment.

In the creation of the data store performance model, for example, as illustrated in FIG. 7, a graph 500 of the performance of the data store with respect to a change in the HW resource amount may be created, and an expression of an approximate curve of the graph, $y=f(x)$, may be used as the data store performance model. Here, y represents the performance of the distributed data store per node, and x represents the HW resource amount per node. It is possible to calculate y by dividing results (an overall performance of the distributed data store) of the performance measurement executed by the data store benchmark execution unit 304 by the number of nodes of the distributed data store. In other words, when y is multiplied by the number of nodes of the distributed data store, the overall performance of the distributed data store is obtained. The creation of the graph and the derivation of an approximate curve expression in the creation of the data store performance model can be achieved by using an existing spreadsheet software, a program, or the like.

FIG. 8 is a configuration diagram of the data store performance model management table according to the embodiment.

The data store performance model is registered in, for example, the data store performance model management table 308. A row 511 of the data store performance model management table 308 stores information (a distributed data store name) indicating a distributed data store corresponding to the data store performance model registered in the data store performance model management table 308. A column 512 stores a type of operation corresponding to the data store performance model. A row 513 stores a type of the HW resource targeted by the data store performance model. In a cell corresponding to each type of operation in the column 512 and the type of HW resource in the row 513, the data store performance model for the type of HW resource in the type of operation is stored by the data store benchmark execution unit 304.

In the present embodiment, the expression (an example of the data store performance model) created based on the results of the performance measurement is stored, but for example, a plurality of sets of HW resource amount and corresponding measured data store performance may be recorded.

Next, an application performance model creation process 600 for creating an application performance model will be described.

Figure 9:
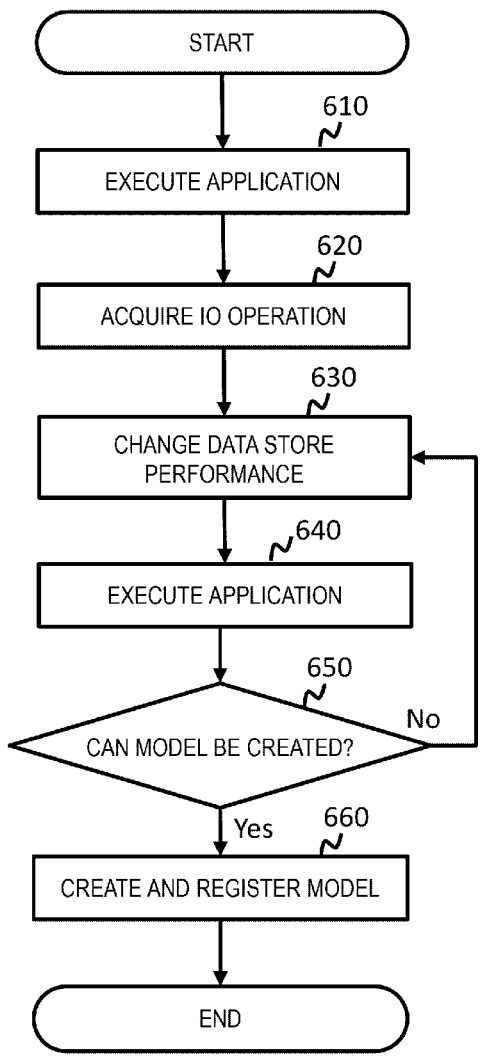
FIG. 9 is a flowchart of an application performance model creation process according to the embodiment.

FIG. 9 is a flowchart of the application performance model creation process according to the embodiment.

In the application performance model creation process according to the present embodiment, an application performance model is created for each type of operation in an application. Here, the operation refers to an IO operation with respect to a data store, and for example, if the data store is a file data store, the operation refers to the sequential read/write, the random read/write, or the metadata operation (for example, the file creation/deletion, the directory creation/deletion), and if the data store is an NoSQL data store, the operation refers to insertion, deletion, or search of data with respect to a data base (DB). When a plurality of algorithms are selectively executed in the application, an application performance model for each algorithm may be created for one application, and when the application includes a plurality of processing phases, an application performance model may be created for each processing phase. When there are a plurality of types of data that can be processed by the application, an application performance model may be created for each type of data.

First, the application execution unit 305 (the CPU 232 that executes the QoS control program 101) causes the application execution infrastructure 160 to execute an instruction to execute an application for which a performance model is to be created, thereby causing the application to be executed (step 610).

The application execution unit 305 acquires a type of operation in the executed application (step 620).

Next, the application execution unit 305 creates an application performance model for the acquired type of operation (steps 630 to 660). The following process may be performed on each acquired type of operation.

First, the application execution unit 305 changes the performance of the distributed data store (the data store performance), and specifies the HW resource amount corresponding to the changed performance of the data store by using the data store performance model (step 630). Next, the application execution unit 305 allocates resources to the data store by the specified HW resource amount. The HW resource allocation amount in the HW resource is changed by the application execution unit 305 cooperating with the resource allocation control programs 111, 121, and the like of the respective storage nodes. Specifically, the application execution unit 305 transmits the HW resource allocation amount for the data store program of the distributed data store to the resource allocation control program of each storage node. Accordingly, the resource allocation control program receives the HW resource allocation amount and allocates the HW resource to the data store program by the received HW resource allocation amount. The allocation of the HW resource in the storage node can be achieved by an existing program or software. For example, in the case of a Linux operating system, a resource allocation function called Cgroups can be used. When this Cgroups is used, a desired amount of HW resource can be allocated to a program operating on the Linux operating system.

Next, the application execution unit 305 causes the application execution infrastructure 160 to execute the application and acquires the performance of the application (step 640). Here, the performance of the application (the application performance) may be acquired based on a size of data to be processed and a processing time, and the performance of the application may be, for example, a data processing amount per unit time in the application. In addition, the performance of the application is not limited thereto, and may be, for example, the number of processes in response to a request per unit time by the application or the number of process files per unit time. According to this process, one piece of data indicating a correspondence relationship between the application performance and the data store performance with which the application performance is obtained, which are used for creating the application performance model, is obtained.

Next, the application execution unit 305 determines whether the application performance model can be created, specifically, whether the performance measurement is performed the number of times required for creating the application performance model (step 650).

As a result, when the measurement is not performed the number of times required for creating the application performance model (No in step 650), the application execution unit 305 advances the process to step 630, and repeats the change in the data store performance and the execution of the performance measurement of the application. The number of times the performance measurement is performed to create the application performance model and the amount of change in the data store performance to be changed for each performance measurement are determined in advance.

On the other hand, when the measurement is performed the number of times required for creating the application performance model (Yes in step 650), the application execution unit 305 creates the application performance model based on a plurality of measurement results, registers the created application performance model in the application performance model management table 307 (see FIG. 11) (step 660), and ends the process.

Here, the creation of the application performance model and the registration of the application performance model will be described.

FIG. 10 is a diagram illustrating an outline of the application performance model according to the embodiment.

In the creation of the application performance model, for example, as illustrated in FIG. 10, a graph 700 of the performance of the application with respect to the change in the data store performance may be created, and an expression of an approximate curve of the graph, $y=f(x)$, may be used as the application performance model. Here, y represents the performance of the application, and x represents the performance of the data store. It is possible to use y as a result of the performance measurement executed by the application execution unit 305. The creation of the graph and the derivation of the approximate curve expression in the creation of the application performance model can be achieved by using an existing spreadsheet software, a program, or the like.

FIG. 11 is a configuration diagram of the application performance model management table according to the embodiment.

The application performance model is registered in, for example, the application performance model management table 307. A row 711 of the application performance model management table 307 stores information (an application name) indicating an application corresponding to the application performance model registered in the application performance model management table 307. A column 712 stores a type of operation corresponding to the application performance model. A column 713 stores an application performance model for the type of operation in the column 712 of the corresponding row. The application performance model is stored by the application execution unit 305.

In the present embodiment, the expression (an example of the application performance model) created based on the results of the performance measurement is stored, but for example, a plurality of sets of data store performance and corresponding measured application performance may be recorded.

Next, a configuration in which the type of operation in the application can be acquired in step 620 of the application performance model creation process 600 will be described.

FIG. 12 is a diagram illustrating an implementation example of a processing unit that analyzes an IO operation according to the embodiment.

For example, in an application 720 (for example, the applications 161 and 162) executed on the application execution infrastructure 160, an IO analysis program for notifying the application execution unit 305 of an IO type to be used may be implemented as a wrapper of an IO execution library to be used by the application. With such a configuration, when the IO execution library is used in the application 720, the IO analysis program notifies the application execution unit 305 of the used I/O type.

Next, an application execution process when an application is executed in the application execution infrastructure 160 will be described.

Figure 13:
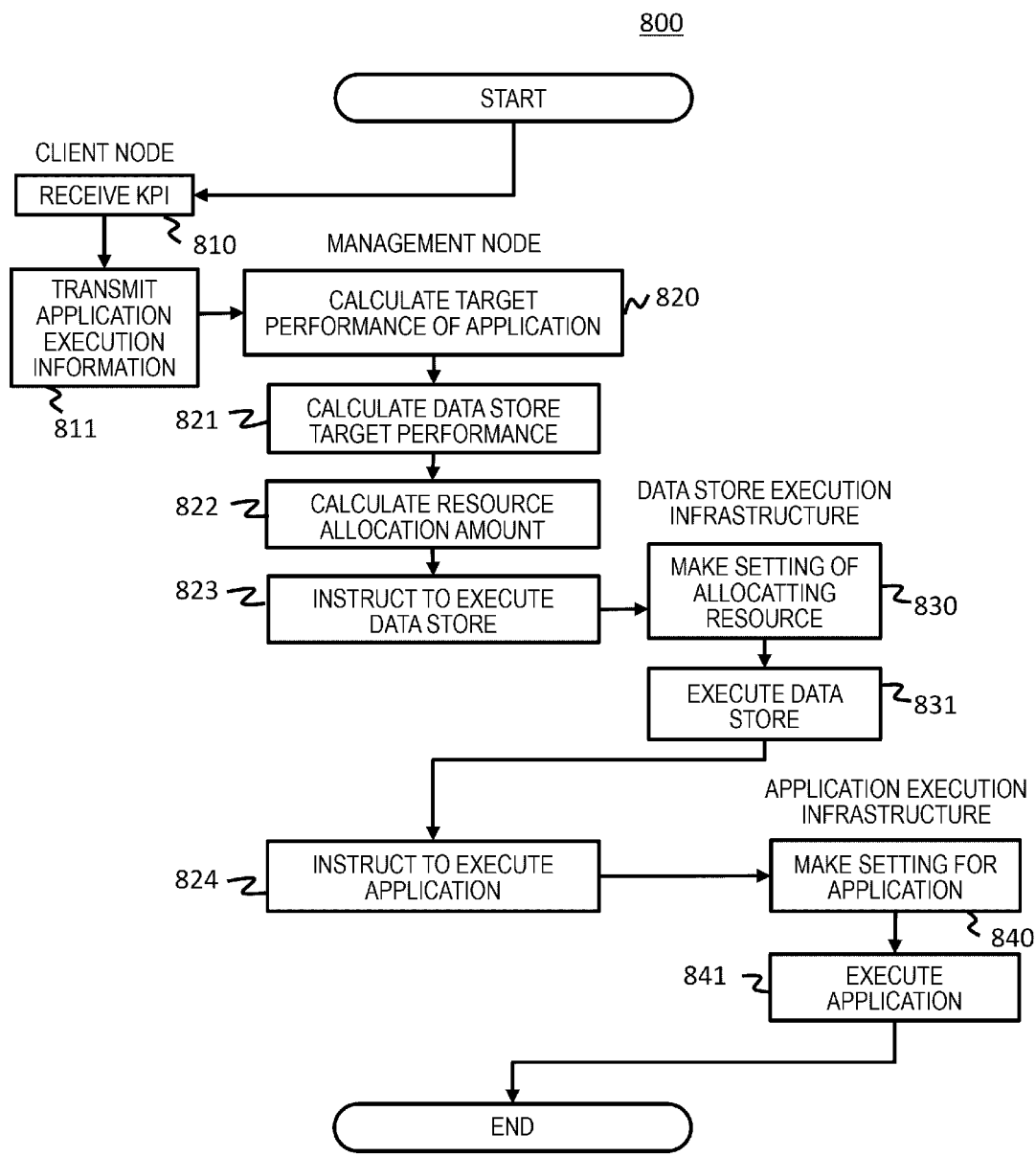
FIG. 13 is a flowchart of an application execution process according to the embodiment.

FIG. 13 is a flowchart of the application execution process according to the embodiment.

In the application execution process, the client program 331 of the client node 170 displays a KPI registration screen 900 (see FIG. 14) and receives the KPI input by a user (step 810).

Here, the KPI registration screen 900 will be described.

Figure 14:
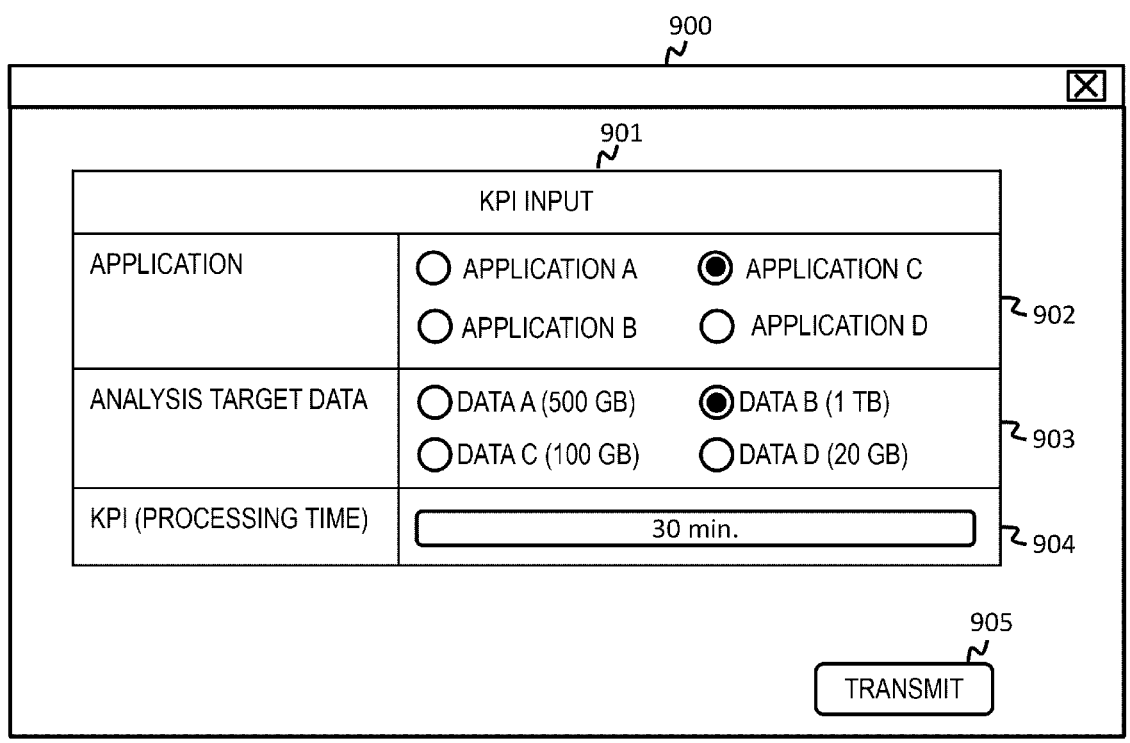
FIG. 14 is a diagram illustrating an example of a KPI registration screen according to the embodiment.

FIG. 14 is a diagram illustrating an example of the KPI registration screen according to the embodiment.

For example, the KPI registration screen 900 is created by the management node 100 based on information of the application management table 321 and the data store management table 311, and is displayed on the client node 170. The KPI registration screen 900 includes a KPI input field 901 for inputting a KPI and a "transmit" button 905.

The KPI input field 901 includes a use application selection field 902, an analysis target data selection field 903, and a KPI (processing time) input field 904.

In the use application selection field 902, at least one of the applications registered in the application management table 321 is selectably displayed. The user selects an application to be used from the use application selection field 902. In the analysis target data selection field 903, at least one of the data registered in the data store management table 311 is selectably displayed. The user selects data to be processed by the application from the analysis target data selection field 903. The KPI (processing time) input field 904 receives an input of a processing time as a target (target processing time) when a process is performed on the data selected by the selected application.

The "transmit" button 905 is a button for receiving an instruction to transmit information input in the input field 901 to the management node 100. When the "transmit" button 905 is pressed, the client node 170 transmits application execution information 1200 (see FIG. 15) to the management node 100 based on the information input in the input field 901.

Returning to the description of FIG. 13, when the client program 331 receives the transmission instruction for the KPI registration screen 900, the client program 331 transmits the application execution information 1200 (see FIG. 15) based on the information input in the KPI registration screen 900 (step 811).

Here, the application execution information 1200 will be described.

Figure 15:
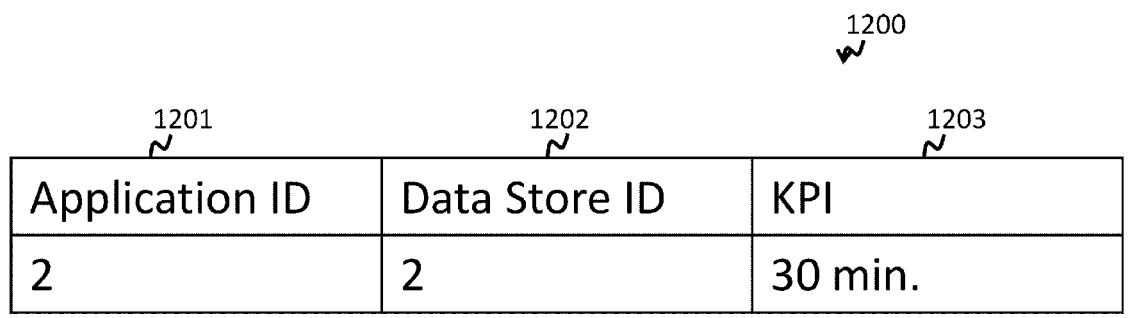
FIG. 15 is a configuration diagram of application execution information according to the embodiment.

FIG. 15 is a configuration diagram of the application execution information according to the embodiment.

The application execution information 1200 includes fields of an application ID 1201, a data store ID 1202, and a KPI 1203. The application ID 1201 stores an ID of an application selected as an application to be used in the KPI registration screen 900. The data store ID 1202 stores an ID of a data store that stores data selected as data to be processed by an application in the KPI registration screen 900. The KPI 1203 stores the target processing time input in the KPI registration screen 900.

Returning to the description of FIG. 13, the resource allocation amount calculation unit 103 of the management node 100 receives the application execution information 1200, calculates the target performance of the application based on the application execution information 1200 (step 820), selects an appropriate application performance model from the application performance model management table 307, and calculates the performance of the data store required for achieving the target performance (data store target performance: required performance) using the application performance model (step 821). When a plurality of types of operations are executed in an application, a plurality of application performance models corresponding to various types of operations may be used to determine the data store target performance based on a plurality of data store performances obtained from the respective performance models. For example, the data store target performance for each type may be maintained, that is, a plurality of data store target performances may be maintained, the maximum performance among the data store performances obtained from the respective performance models may be set as the data store target performance, and when a plurality of types of operations are simultaneously executed, the performance obtained by summing the corresponding data store performances may be set as the data store target performance. When an algorithm for data in an application can be specified, a performance model corresponding to the algorithm may be used. For each processing phase in the application, a performance model corresponding to the processing phase may be used to calculate the data store target performance for each processing phase.

Next, the resource allocation amount calculation unit 103 calculates (determines) the HW resource amount (resource allocation amount) to be actually allocated to the distributed data store in order to achieve the calculated data store target performance by using the data store performance model of the data store performance model management table 308 (step 822). Here, the calculated HW resource amount is the HW resource amount to be allocated to the data store program of the distributed data store in each storage node.

Specifically, for example, the resource allocation amount calculation unit 103 calculates, based on the performance model (expression) recorded in the data store performance model management table 308 and the data store target performance of each type of operation, the HW resource amount required for each type of operation in order to achieve the data store target performance. More specifically, the resource allocation amount calculation unit 103 divides the data store target performance of each type of operation by the number of storage nodes constituting the distributed data store, substitutes the result thereof into y of the expression (y=f(x)) of the performance model, and calculates the required HW resource amount x. Next, the resource allocation amount calculation unit 103 checks the required HW resource amount for each HW resource for each type of operation. Next, the resource allocation amount calculation unit 103 determines the maximum value of the required HW resource amounts as the resource allocation amount. Here, the reason why the maximum value of the required HW resource amounts is determined as the resource allocation amount is to ensure that the target performance can be achieved even when any operation is executed in the distributed data store. When a plurality of types of operations are simultaneously executed and there is no need to achieve the target performance in the plurality of types of operations, a total value of the HW resource amounts required for these types of operations may be set as the resource allocation amount. Whether the maximum value of the required HW resource amounts is set as the resource allocation amount or the total value of the plurality of required HW resource amounts is set as the resource allocation amount may be determined according to a policy of the QoS set in advance.

In addition, when the data store target performance for each processing phase of the application is calculated, a required resource allocation amount for each processing phase may be calculated, and in this case, the resource allocation amount of each processing phase may be determined as the resource allocation amount to be set in each processing phase, or the maximum resource allocation amount of the resource allocation amounts may be determined as the resource allocation amount to be actually allocated to the application.

Next, the resource allocation amount calculation unit 103 transmits, to the data store execution infrastructure 130, an instruction to execute the data store so as to obtain the calculated resource allocation amount (step 823). When changing the resource allocation amount for each processing phase of the application, an instruction for setting the resource allocation amount corresponding to the processing phase is transmitted in each processing phase.

In the storage nodes 110, 120, and the like that execute the data store execution infrastructure 130, the resource allocation control programs 111, 121, and the like make a setting of allocating the HW resource to the data store program constituting the data store in accordance with an instruction from the management node 100 (step 830). When changing the resource allocation amount for each processing phase, the resource allocation control program changes the resource allocation amount according to the processing phase of the application.

Next, the data store execution infrastructure 130 executes the data store to which the HW resource is allocated (step 831).

Next, the QoS control program 101 transmits an execution instruction of the application to the application execution infrastructure 160 (step 824).

The execution infrastructure programs 322 and 323 of the application execution infrastructure 160 make, based on the execution instruction, a setting required for the application to use the data store (step 840). Accordingly, the application can use a data store to which an appropriate HW resource is allocated.

Here, the setting of the application will be described.

FIG. 16 is a configuration diagram of application setting information according to the embodiment.

Application setting information 1400 in FIG. 16 is an example of setting information in a case where the data store is constituted as a file server.

The application setting information 1400 includes fields of a setting (Config) 1401 and a content 1402. In the setting 1401, items to be set are stored. The items to be set include, for example, a file server IP, a port, and a mount directory. In the content 1402, a setting content for the item to be set is stored.

Returning to the description of FIG. 13, the application execution infrastructure 160 executes the application (step 841), and ends the process.

According to the above process, when the user inputs the target processing time of the application, an appropriate HW resource is allocated to the data store used by the application and the application is executed, so that the target can be achieved.

Next, a specific example of a resource allocation amount calculation method (corresponding to steps 820 to 822 in FIG. 13) will be described.

Figure 17:
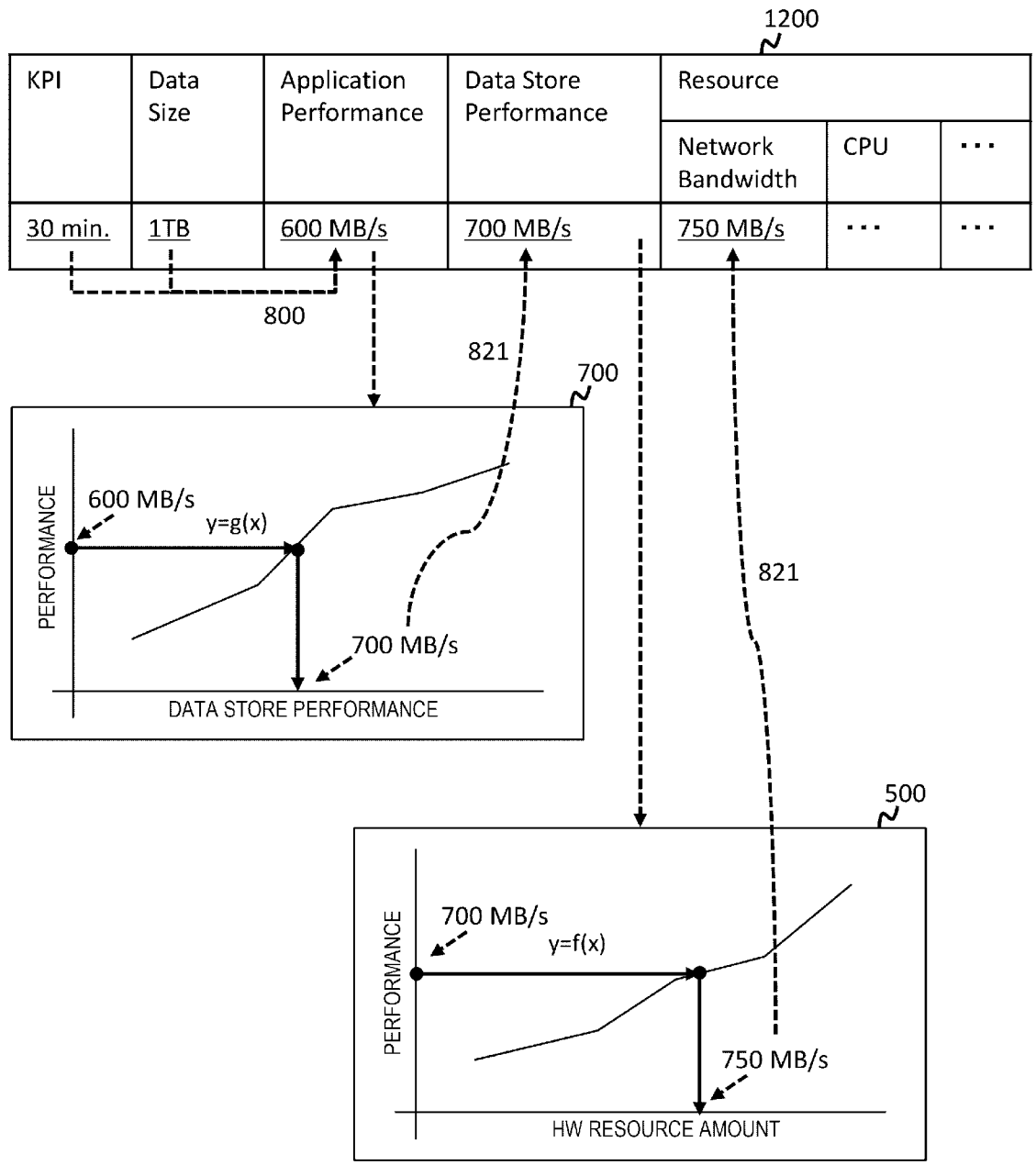
FIG. 17 is a diagram illustrating a specific example of a resource allocation amount calculation method according to the embodiment.

FIG. 17 is a diagram illustrating a specific example of the resource allocation amount calculation method according to the embodiment.

Here, in the client node 170, in the KPI registration screen 900, data having a data size of 1 TB is selected and 30 minutes is input as the KPI (processing time).

The resource allocation amount calculation unit 103 of the management node 100 calculates an application target performance as 600 MB/s based on the 30 minutes and the data size of 1 TB (step 820).

Next, the resource allocation amount calculation unit 103 calculates the data store target performance (700 MB/s) corresponding to the application target performance (600 MB/s) using the application performance model as illustrated in the graph 700 (step 821).

Next, the resource allocation amount calculation unit 103 calculates the HW resource amount (a network band of 750 MB/s) corresponding to the data store target performance (700 MB/s) using the data store performance model as illustrated in the graph 500 (step 822). The resource allocation amount calculation unit 103 also calculates another HW resource amount using the data store performance model corresponding to each HW. In the following, the calculated HW resource is allocated to the data store.

As described above, in the computing system 1 according to the present embodiment, in the client node 170, the HW resource can be easily and appropriately allocated to the data store by inputting the information capable of specifying the target performance of the application, such as the target processing time and the data size to be processed for the application.

The invention is not limited to the above-mentioned embodiments, and can be appropriately modified and implemented without departing from the gist of the invention.

For example, in the above-mentioned embodiments, mathematical expressions are used as the application performance model and the data store performance model, but the invention is not limited thereto, and for example, an inference model learned by machine learning may be used.

In the above-mentioned embodiments, the target processing time and data are specified as the information capable of specifying the target performance of the application, but the invention is not limited thereto, other information capable of specifying the target performance for the application may be specified, and for example, the target performance of the application such as a data processing speed of the application may be directly specified.

In the above-mentioned embodiments, the application performance model 104 and the data store performance model 105 are separate models, but the application performance model 104 and the data store performance model 105 may be combined and constituted as one model that outputs the HW resource of the data store using the target performance of the application as an input.

In the above-mentioned embodiments, a part or all of the processes performed by the CPU may be performed by a hardware circuit. In addition, the programs in the above-mentioned embodiments may be installed from a program source. The program source may be a program distribution server or a recording medium (for example, a portable nonvolatile recording medium).

What is claimed is:

1. A resource allocation control device that controls a hardware resource amount of a plurality of nodes to be allocated to a distributed data store that is executed by the plurality of nodes and distributes and manages data by the plurality of nodes, the resource allocation control device comprising:

a storage unit configured to store application performance information indicating a correspondence relationship between a performance of an application that accesses the distributed data store and executes a predetermined process and a distributed data store performance required for achieving the performance of the application indicated by the stored application performance information, and store data store performance resource amount information indicating a correspondence relationship between the hardware resource amount and a data store performance that is achievable by the distributed data store according to hardware of the resource amount; and a processor connected to the storage unit, wherein the processor is configured to:

receive target performance information capable of specifying a target performance of the application;

determine a required performance which is the distributed data store performance required for achieving a performance to be specified by the target performance information based on the application performance information;

determine the hardware resource amount required for achieving the required performance based on the data store performance resource amount information; and set the hardware of the determined resource amount to be allocated to the distributed data store.

2. The resource allocation control device according to claim 1, wherein the processor is configured to:

acquire, by changing the hardware resource amount to be allocated to the distributed data store to a plurality of resource amounts, a data store performance to be achieved when each of the plurality of resource amounts is allocated;

create the data store performance resource amount information based on the allocated hardware resource amount and the data store performance to be achieved; and store the created performance resource amount information in the storage unit.

3. The resource allocation control device according to claim 1, wherein the processor is configured to:

acquire, by changing the distributed data store performance, an application performance to be achieved by the data store performance;

create the application performance information based on the data store performance and the application performance to be achieved; and store the created application performance information in the storage unit.

4. The resource allocation control device according to claim 1, wherein the application performance information is an application performance model capable of deriving the distributed data store performance that is capable of achieving the performance, from the target performance of the application.

5. The resource allocation control device according to claim 1, wherein the data store performance resource amount information is a data store performance model capable of deriving the hardware resource amount that is capable of achieving the performance, from distributed data store performances that is achievable by the distributed data store.

6. The resource allocation control device according to claim 1, wherein the application performance information includes a correspondence relationship for each type of TO operation in the application.

7. The resource allocation control device according to claim 1, wherein the application performance information includes a correspondence relationship for each processing phase in the application.

8. The resource allocation control device according to claim 7, wherein the processor is configured to:

receive target performance information capable of specifying a target performance of the application for each processing phase of the application;

determine, for each processing phase, a required performance which is a distributed data store performance required for achieving the performance to be specified by the target performance information based on the application performance information;

determine a hardware resource amount required for achieving the required performance based on the data store performance resource amount information; and set the hardware of the determined resource amount to be allocated to the distributed data store.

9. A computing system comprising: a plurality of nodes configured to execute a distributed data store that distributes and manages data; and a resource allocation control device configured to control a hardware resource amount of the nodes to be allocated to the distributed data store, wherein the resource allocation control device is configured to:

store application performance information indicating a correspondence relationship between a performance of an application that accesses the distributed data store and executes a predetermined process and a distributed data store performance required for achieving the performance of the application indicated by the stored application performance information, and store data store performance resource amount information indicating a correspondence relationship between the hardware resource amount and a data store performance that is achievable by the distributed data store according to hardware of the resource amount;

receive target performance information capable of specifying a target performance of the application;

determine a required performance which is the distributed data store performance required for achieving a performance to be specified by the target performance information based on the application performance information;

determine the hardware resource amount required for achieving the required performance based on the data store performance resource amount information; and set the hardware of the determined resource amount to be allocated to the distributed data store.

10. A resource allocation control method performed by a resource allocation control device that controls a hardware resource amount of a plurality of nodes to be allocated to a distributed data store that is executed by the plurality of nodes and distributes and manages data by the plurality of nodes, the resource allocation control method comprising:

storing application performance information indicating a correspondence relationship between a performance of an application that accesses the distributed data store and executes a predetermined process and a distributed data store performance required for achieving the performance of the application indicated by the stored application performance information, and storing data store performance resource amount information indicating a correspondence relationship between the hardware resource amount and a data store performance that is achievable by the distributed data store according to hardware of the resource amount;

receiving target performance information capable of specifying a target performance of the application;

determining a required performance which is the distributed data store performance required for achieving a performance to be specified by the target performance information based on the application performance information;

determining the hardware resource amount required for achieving the required performance based on the data store performance resource amount information; and setting the hardware of the determined resource amount to be allocated to the distributed data store.

\* \* \* \* \*